US008170047B2

(12) United States Patent
Andersen et al.

(10) Patent No.: US 8,170,047 B2
(45) Date of Patent: May 1, 2012

(54) DATA TRANSMISSION WITH EFFICIENT SLOT AND BLOCK FORMATS IN A WIRELESS COMMUNICATION SYSTEM

(75) Inventors: Niels Peter Skov Andersen, Roskilde (DK); Lorenzo Casaccia, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 762 days.

(21) Appl. No.: 11/430,808

(22) Filed: May 8, 2006

(65) Prior Publication Data

US 2007/0002823 A1 Jan. 4, 2007

Related U.S. Application Data

(60) Provisional application No. 60/679,316, filed on May 9, 2005.

(51) Int. Cl.
*H04L 12/56* (2006.01)
*H04J 1/16* (2006.01)

(52) U.S. Cl. .......................... 370/442; 370/252; 370/278

(58) Field of Classification Search .................. 370/252, 370/442, 278
See application file for complete search history.

(56) References Cited

U.S. PATENT DOCUMENTS

| 5,504,773 | A | 4/1996 | Padovani et al. |
| 5,513,379 | A | 4/1996 | Benveniste et al. |
| 6,760,599 | B1 * | 7/2004 | Uhlik ............................ 455/525 |
| 7,280,584 | B2 * | 10/2007 | Zeira ............................. 375/147 |
| 7,609,608 | B2 * | 10/2009 | Rogerson et al. ............. 370/203 |
| 2004/0001539 | A1 * | 1/2004 | Sankaran et al. ............. 375/231 |
| 2004/0062211 | A1 | 4/2004 | Uhlik |
| 2004/0170239 | A1 * | 9/2004 | Fazel et al. ..................... 375/354 |
| 2004/0252790 | A1 * | 12/2004 | Yang et al. ..................... 375/340 |
| 2009/0207899 | A1 * | 8/2009 | Chen et al. ..................... 375/231 |
| 2011/0026576 | A1 * | 2/2011 | Molev-Shteiman et al. . 375/231 |

FOREIGN PATENT DOCUMENTS

| CN | 1072048 A | 5/1993 |
| JP | 64007827 | 1/1989 |
| JP | 11266216 A | 9/1999 |
| JP | 2000324193 | 11/2000 |

(Continued)

OTHER PUBLICATIONS

3GPP TS 04.18, "Technical Specification Group GSM EDGE Radio Access Network; Mobile Radio Interface Layer 3 Specification, Radio Resource Control Protocol," Release 1999, Jun. 2001.

(Continued)

*Primary Examiner* — John Pezzlo
(74) *Attorney, Agent, or Firm* — Charles Chesney

(57) ABSTRACT

Techniques for transmitting data and training sequence efficiently using new slot and block formats are described. A transmitter processes (e.g., encodes, interleaves, and partitions) a data block to obtain multiple output blocks. For each output block, the transmitter generates multiple bursts having a training sequence that is shared by these bursts. The transmitter sends the multiple bursts for each output block in multiple time slots, e.g., consecutive time slots in one frame. The multiple bursts for each output block may (1) include one or more short training sequences, (2) omit guard periods between adjacent bursts, (3) include a first tail bit field at the start of the first burst and a second tail bit field at the end of the last burst, (4) include at least one stealing flag field, or (5) have any combination of the above.

37 Claims, 10 Drawing Sheets

FOREIGN PATENT DOCUMENTS

| | | |
|---|---|---|
| JP | 2001518765 T | 10/2001 |
| JP | 2002158604 | 5/2002 |
| JP | 2002520985 | 7/2002 |
| JP | 2003198560 A | 7/2003 |
| JP | 2005531260 | 10/2005 |
| KR | 1020050012839 | 2/2005 |
| RU | 2154901 | 8/2001 |
| RU | 2207723 C1 | 6/2003 |
| TW | I226162 | 1/2005 |
| WO | WO9309622 A1 | 5/1993 |
| WO | WO9917563 A2 | 4/1999 |
| WO | WO2004004260 A2 | 1/2004 |
| WO | WO2004077722 A2 | 9/2004 |

OTHER PUBLICATIONS

3GPP TS 05.01, "Technical Specification Group GERAN; Digital Cellular Telecommunications System (Phase 2+), Physical Layer on the Radio Path; General Description," Release 1999, Nov. 2001.

International Search Report—PCT/US06/017961, International Search Authority—ISA/US, Oct. 5, 2006.

Peter Schramm, et al. Radio Interface performance of EDGE, a proposal for enhanced data rates in existing digital cellular systems. 48th IEEE Vehicular Technology Conference, U.S. IEEE, May 18, 1998, vol. 12, pp. 1064-1068.

Written Opinion—PCT/US06/017961, International Search Authority, European Patent Office, May 10, 2006.

Klein et al., "FRAMES Multiple Access Mode 1—Wideband TDMA with and without Spreading", The 8th IEEE International Symposium on Personal, Indoor and Mobile Radio Communications, Helsinki, Finland, Sep. 1-4, 1997, pp. 37-41.

Translation of Office Action in chinese application 200680021239.0 corresponding to U.S. Appl. No. 11/430,808, citing CN1072048 dated Jan. 11, 2011.

Taiwan Search Report—TW095116453—TIPO—Jun. 9, 2011.

* cited by examiner

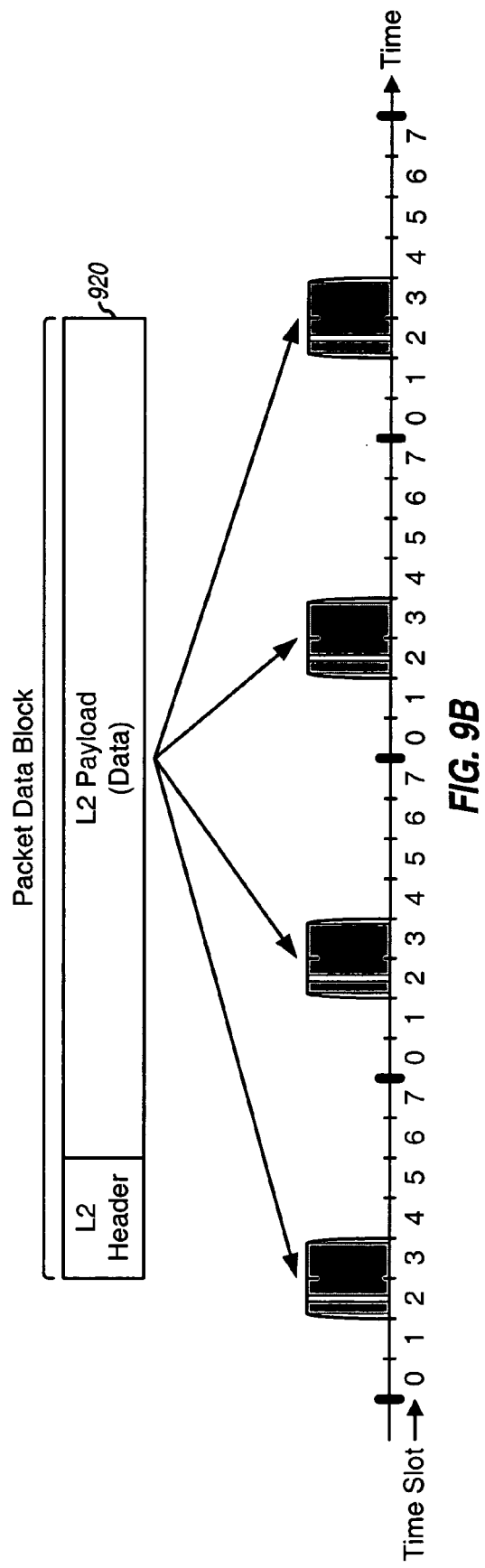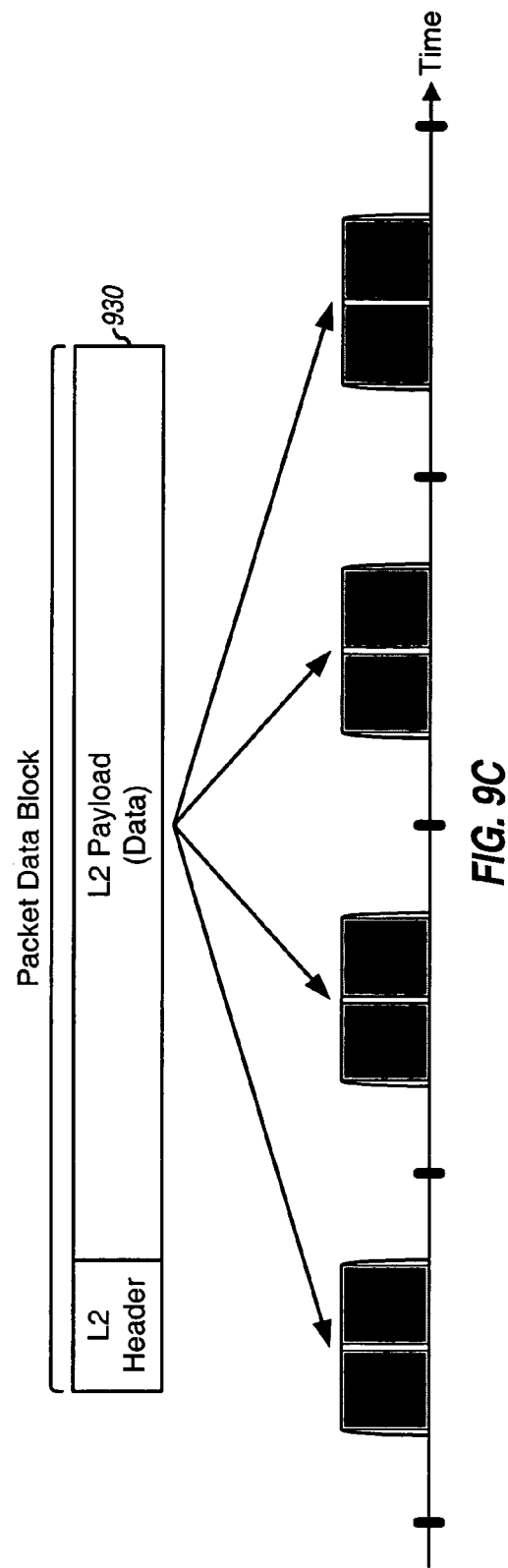

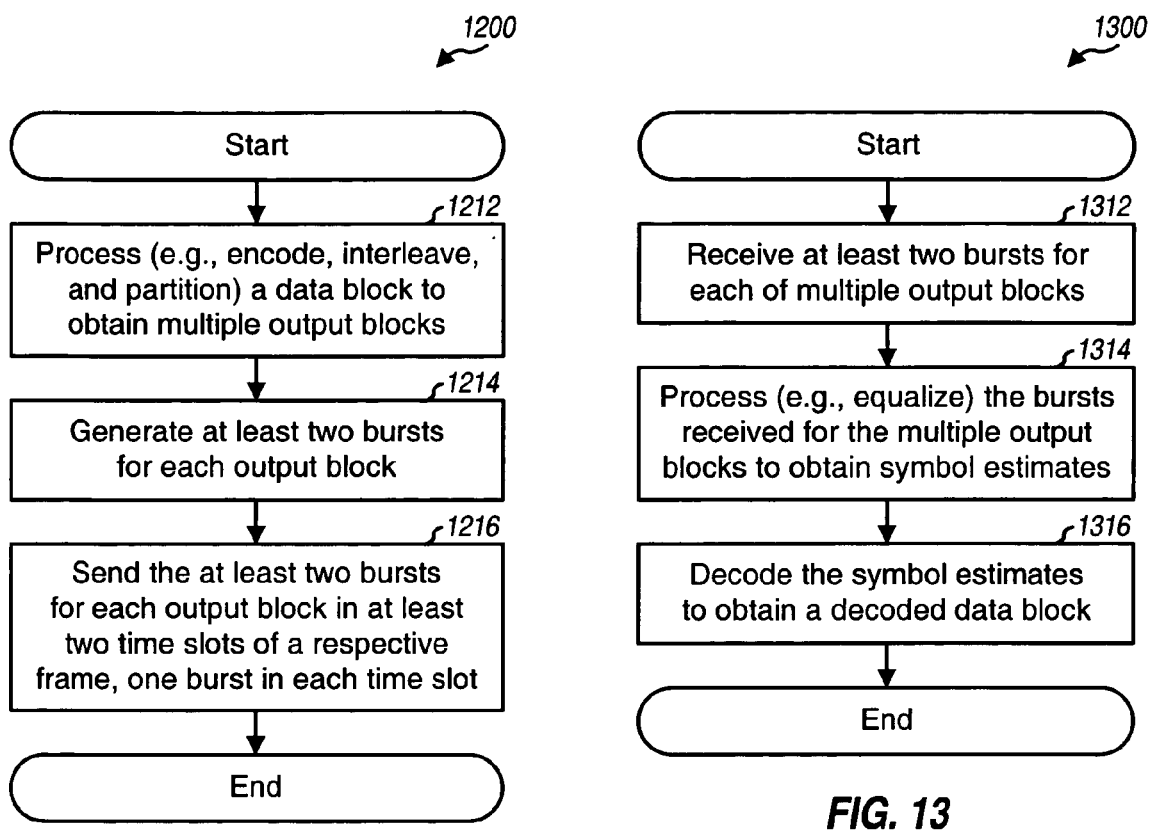

DATA TRANSMISSION WITH EFFICIENT SLOT AND BLOCK FORMATS IN A WIRELESS COMMUNICATION SYSTEM

CLAIM OF PRIORITY UNDER 35 U.S.C. §119

The present Application for Patent claims priority to Provisional Application Ser. No. 60/679,316, entitled "METHOD AND APPARATUS FOR WIRELESS HIGH RATE COMMUNICATIONS," filed May 9, 2005, assigned to the assignee hereof, and expressly incorporated herein by reference.

BACKGROUND

I. Field

The present disclosure relates generally to communication, and more specifically to techniques for transmitting data in a wireless communication system.

II. Background

In a wireless communication system, a transmitter typically processes (e.g., encodes and symbol maps) traffic data to generate data symbols. The transmitter may multiplex a training sequence with the data symbols to assist a receiver perform various functions such as channel estimation. The training sequence is also commonly referred to as pilot. The transmitter then processes the data symbols and training sequence to generate a radio frequency (RF) modulated signal and transmits this signal via a wireless channel. The wireless channel distorts the transmitted signal with a channel response and further degrades the signal with noise and interference.

The receiver receives the transmitted signal and processes the received signal to obtain samples. The receiver may estimate the wireless channel response based on the training sequence. The receiver may then perform data detection (e.g., equalization) on the samples with the channel estimate to obtain symbol estimates, which are estimates of the data symbols sent by the transmitter. The receiver may then process (e.g., symbol demap and decode) the symbol estimates to obtain decoded data.

The training sequence is useful to achieve good performance. However, the training sequence represents overhead that reduces the efficiency of the system. There is therefore a need in the art for techniques to transmit data and training sequence efficiently in a wireless communication system.

SUMMARY

Techniques for transmitting data and training sequence efficiently in a wireless communication system (e.g., a GSM/EDGE system) are described herein. These techniques may utilize new slot formats and/or new block formats having higher data capacity and described below.

According to an exemplary embodiment of the invention, an apparatus is described which includes at least one processor and a memory. The processor(s) generate multiple bursts comprising a training sequence that is shared by the multiple bursts. The processor(s) then send the multiple bursts in multiple time slots, one burst in each time slot. The multiple bursts may include other fields, as described below.

According to another exemplary embodiment, an apparatus is described which includes at least one processor and a memory. The processor(s) receive multiple bursts comprising a training sequence that is shared by the multiple bursts. The multiple bursts are received in multiple time slots, one burst in each time slot. The processor(s) derive a channel estimate based on the training sequence and perform data detection (e.g., equalization) on the multiple bursts with the channel estimate.

According to yet another exemplary embodiment, an apparatus is described which includes at least one processor and a memory. The processor(s) process a data block to obtain multiple output blocks, generate at least two bursts for each output block, and send the at least two bursts for each output block in at least two time slots of a respective frame, one burst in each time slot. The bursts for different output blocks are sent in different frames.

According to yet another exemplary embodiment, an apparatus is described which includes at least one processor and a memory. The processor(s) receive at least two bursts for each of multiple output blocks. The bursts for different output blocks are received in different frames, and each burst for each output block is received in one time slot of a respective frame. The processor(s) process the bursts received for the multiple output blocks to obtain symbol estimates and further decode the symbol estimates to obtain a decoded data block.

Various exemplary embodiments of the invention are described in further detail below.

BRIEF DESCRIPTION OF THE DRAWINGS

FIGS. 9A and 9B show transmission of a packet data block in a 2-slot allocation using normal bursts and concatenated bursts, respectively.

FIG. 9C shows transmission of a packet data block in a multi-slot allocation.

FIG. 12 shows a process for transmitting data with data block aggregation.

FIG. 13 shows a process for receiving data with data block aggregation.

DETAILED DESCRIPTION

The word "exemplary" is used herein to mean "serving as an example, instance, or illustration." Any exemplary embodiment described herein as "exemplary" is not necessarily to be construed as preferred over other exemplary embodiments.

The techniques described herein may be used for various wireless communication systems such as Time Division Multiple Access (TDMA) systems, Code Division Multiple Access (CDMA) systems, Frequency Division Multiple Access (FDMA) systems, and Orthogonal Frequency Division Multiple Access (OFDMA) systems. The terms "system" and "network" are often used interchangeably. A TDMA system may implement a radio technology such as Global System for Mobile Communications (GSM). GSM may utilize General Packet Radio Service (GPRS) or Enhanced Data rates for Global Evolution (EDGE) for data transmission. EDGE is an enhancement to GPRS and supports higher data rates using the same GSM spectrum. A CDMA system may implement a radio technology such as Wideband-CDMA (W-CDMA), cdma2000, and so on. cdma2000 covers IS-2000, IS-856 and IS-95 standards. These various radio technologies and standards are known in the art. GSM and W-CDMA are described in documents from an organization named "3rd Generation Partnership Project" (3GPP). cdma2000 is described in documents from an organization named "3rd Generation Partnership Project 2" (3GPP2). For clarity, the techniques are specifically described below for a GSM EDGE radio access network (GERAN), and GSM terminology is used in much of the description below.

Figure 1:
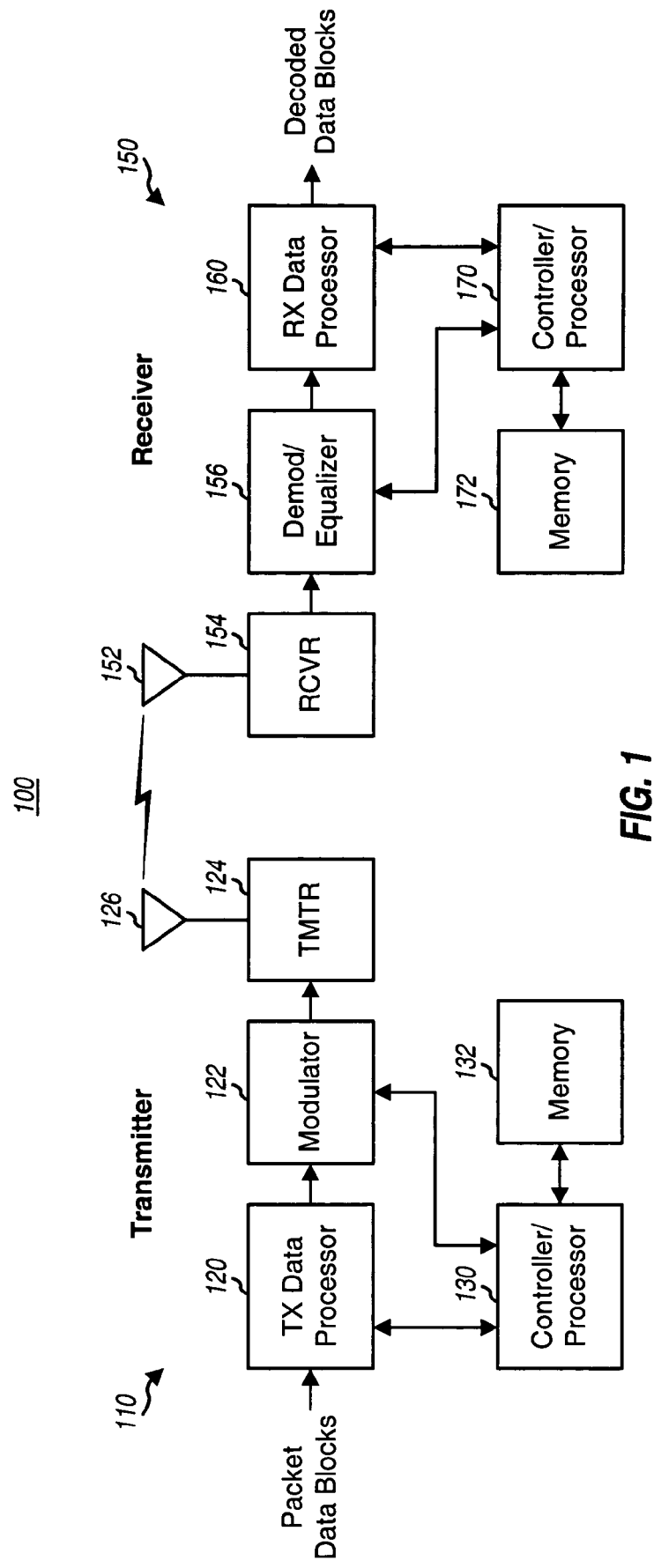
FIG. 1 shows a block diagram of a transmitter and a receiver.

FIG. 1 shows a block diagram of an exemplary embodiment of a transmitter 110 and a receiver 150 in a wireless communication network 100, e.g., a GERAN. For downlink transmission, transmitter 110 may be part of a base station (BS), and receiver 150 may be part of a mobile station (MS). For uplink transmission, transmitter 110 may be part of a mobile station, and receiver 150 may be part of a base station. A base station is generally a fixed station that communicates with the mobile stations and may also be referred to as a Node B, an access point, a base transceiver station (BTS), or some other terminology. A mobile station may be fixed or mobile and may also be referred to as a user equipment (UE), a user terminal, a terminal, a subscriber station, or some other terminology. A mobile station may be a cellular phone, a personal digital assistant (PDA), a wireless device, a wireless modem, a handheld device, or some other device or apparatus.

At transmitter 110, a transmit (TX) data processor 120 receives traffic data that may be partitioned into packet data blocks. Processor 120 processes (e.g., encodes and interleaves) each packet data block in accordance with a coding scheme (MCS) and provides multiple (e.g., four) output blocks for the packet data block. Processor 120 may perform processing for Radio Link Control (RLC) and Medium Access Control (MAC), which are two sublayers at a link layer (L2) in a protocol stack. A modulator 122 multiplexes the output blocks with training sequences and overhead bits, processes the multiplexed data, training sequence, and overhead as specified by GSM/EDGE, and provides output symbols. Modulator 122 may perform processing for a physical layer (L1) that is below the link layer in the protocol stack. A transmitter unit (TMTR) 124 processes (e.g., converts to analog, amplifies, filters, and frequency upconverts) the output symbols and generates an RF modulated signal, which is transmitted from an antenna 126.

At receiver 150, an antenna 152 receives the transmitted signal and provides a received signal to a receiver unit (RCVR) 154. Receiver unit 154 processes (e.g., filters, amplifies, frequency downconverts, and digitizes) the received signal to obtain samples. A demodulator (Demod)/equalizer 156 performs data detection (e.g., equalization) on the samples and provides symbol estimates. A receive (RX) data processor 160 processes (e.g., deinterleaves and decodes) the symbol estimates to obtain decoded data blocks. In general, the processing by demodulator 156 and RX data processor 160 is complementary to the processing by modulator 122 and TX data processor 120, respectively, at transmitter 110.

Controllers/processors 130 and 170 direct the operation of various processing units at transmitter 110 and receiver 150, respectively. Memories 132 and 172 store program codes and data for transmitter 110 and receiver 150, respectively.

Figure 2:
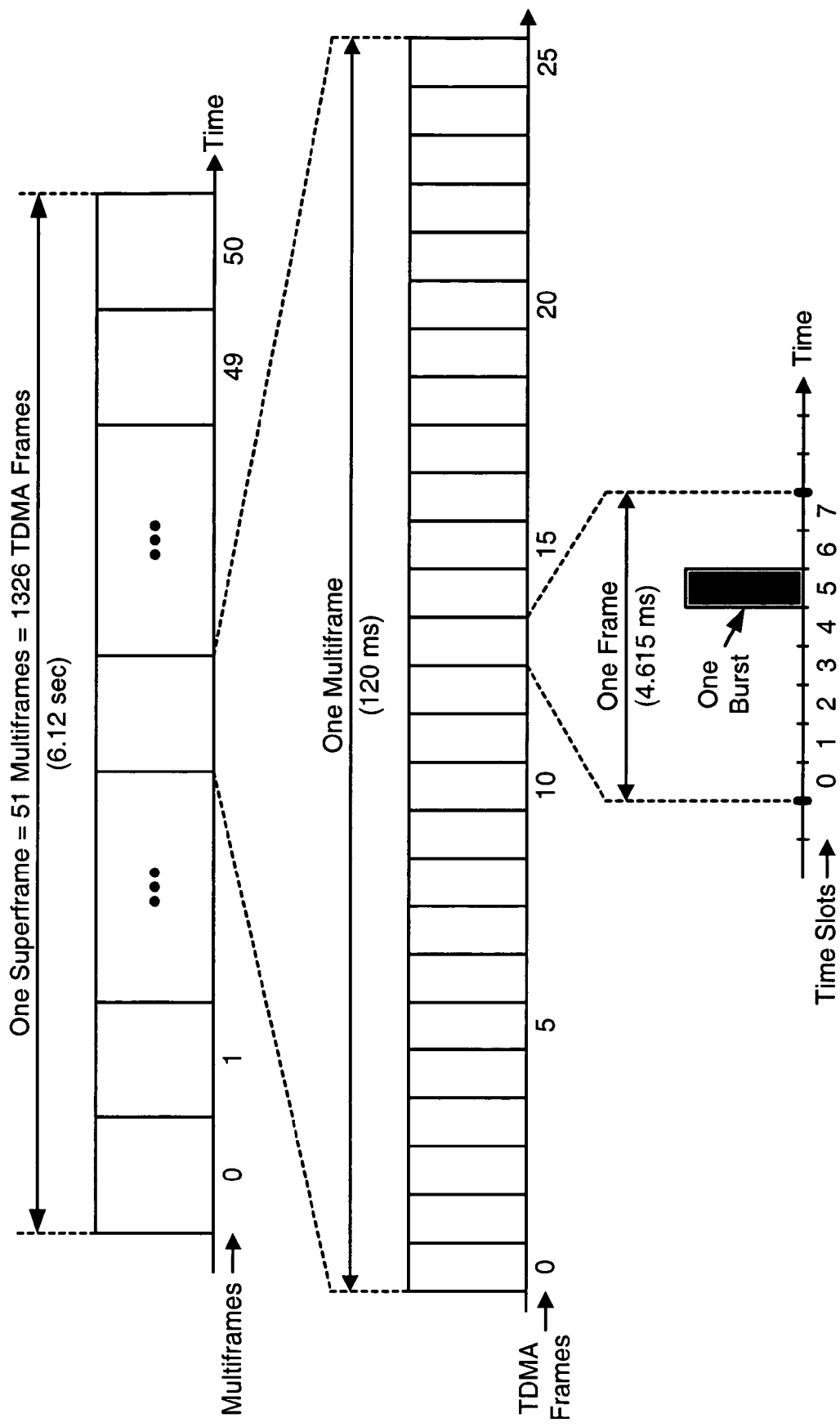
FIG. 2 shows a frame structure in GSM/EDGE.

FIG. 2 shows a frame structure in GSM/EDGE. The timeline for data transmission is divided into superframes. Each superframe has a duration of 6.12 seconds and includes 1326 TDMA frames. A superframe may be partitioned into 51 multiframes. Each multiframe spans 120 milliseconds (ms) and includes 26 TDMA frames, which are labeled as TDMA frames 0 through 25. Traffic data may be sent in TDMA frames 0 through 11 and TDMA frames 13 through 24 of each multiframe. Each TDMA frame spans 4.615 ms and is further partitioned into 8 time slots, which are labeled as time slots 0 through 7. A transmission in each time slot is referred to as a "burst" in GSM. The frame structure for GSM/EDGE is described in 3GPP TS 05.01, entitled "Technical Specification Group GERAN; Digital cellular telecommunications system (Phase 2+); Physical layer on the radio path; General description," Release 1999, November 2001, which is publicly available.

Time slot management and scheduling in GERAN occur on two levels: assignment and allocation, which may be briefly described as follows:

Assignment—a user is assigned a set of one or more time slots of an RF channel on which the user might receive data. The assigned time slots may be shared with up to six other users. Assignment of time slots is semi-static and controlled by upper-layer signaling.

Allocation—a user is allocated a given time slot if data is sent in that time slot to the user. Allocations of time slots are dynamic and controlled on a per packet data block basis by the MAC layer. Each packet data block includes a header that indicates the intended recipient of that packet data block.

For a voice call, a mobile station/user may be assigned one time slot for the duration of the call. For a packet data call, a user may be assigned one or multiple time slots. A multi-slot allocation is an allocation of more than one consecutive or non-consecutive time slot in a TDMA frame to a user. For both voice and packet data, user-specific data for a user may be sent in each time slot assigned to that user and in TDMA frames used for traffic data.

Figure 3:
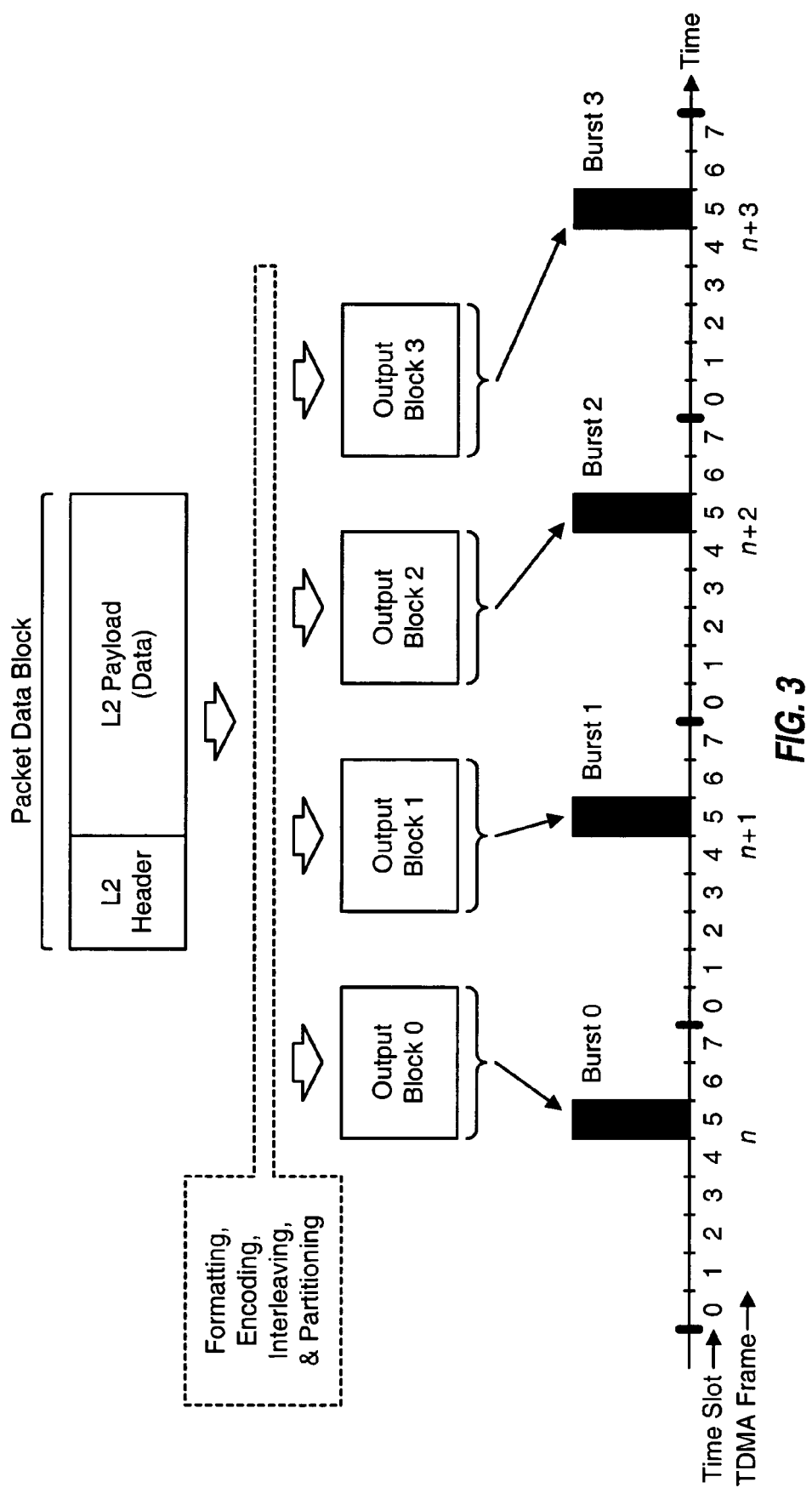
FIG. 3 shows transmission of a packet data block in GSM/EDGE.

FIG. 3 shows transmission of a packet data block in GSM/EDGE. A packet data block may also be referred to as a message, a packet, a data block, an RLC block, an RLC/MAC block, or some other terminology. The packet data block is processed (e.g., formatted, encoded, interleaved, and partitioned) to obtain four output blocks. Four bursts are then generated for the four output blocks, as described below. The four bursts are sent in four time slots with the same index in four consecutive TDMA frames. The packet data block is thus sent over four TDMA frames to achieve time diversity.

1. Slot Formats For Physical Layer

Figure 4:
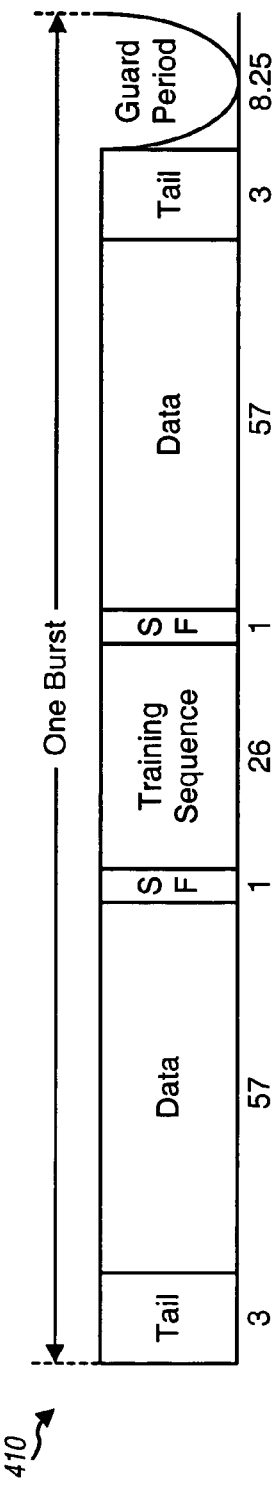
FIG. 4 shows a normal burst in EDGE.

FIG. 4 shows the format of a normal burst 410 used to send traffic data in EDGE. Normal burst 410 includes two tail bit fields, two data fields, two stealing flag (SF) fields, a training sequence field, and a guard period. The duration of each field, in number of symbols, is shown below the field. EDGE uses either GMSK or 8-PSK. Each symbol carries one bit in GMSK and three bits in 8-PSK. Each tail bit field carries tail bits, e.g., all ones or all zeros. The tail bits are used to set an equalizer/decoder at the receiver to a known state at the start and end of the burst. The stealing flags may be used to indicate which packet format is employed for a packet data block, whether traffic data or signaling is being sent in the packet data block, and/or other information regarding the packet data block. Each data field carries traffic data. The training sequence field carries one of a set of predetermined 26-symbol sequences that are identified by different training sequence codes (TSCs). The guard period is provided to allow the transmitter to ramp up prior to the first tail bit field and to ramp down after the last tail bit field in a manner to minimize interference to other RF channels.

When EDGE uses GMSK, the normal burst format is slightly different from the normal burst format used with 8-PSK. Stealing flag fields are used to distinguish among four possible packet formats and are placed differently with respect to the 8-PSK case. Each data field includes 58 symbols.

Normal burst 410 in FIG. 4 may be used to send 114 data symbols and 34 overhead symbols in 156.25 symbol periods. This represents an efficiency of approximately 73% (or $114/156.25$) for data.

In an exemplary embodiment, new slot formats having higher data efficiency are described. These new slot formats remove certain overhead fields, such as the training sequence (TS) field and the guard period, in some bursts to increase data capacity. Some new slot formats also involve aggregation of multiple time slots in multi-slot allocations. Some new slot formats may be used for single-slot allocations while other new slot formats are suitable for multi-slot allocations.

Figure 5A:
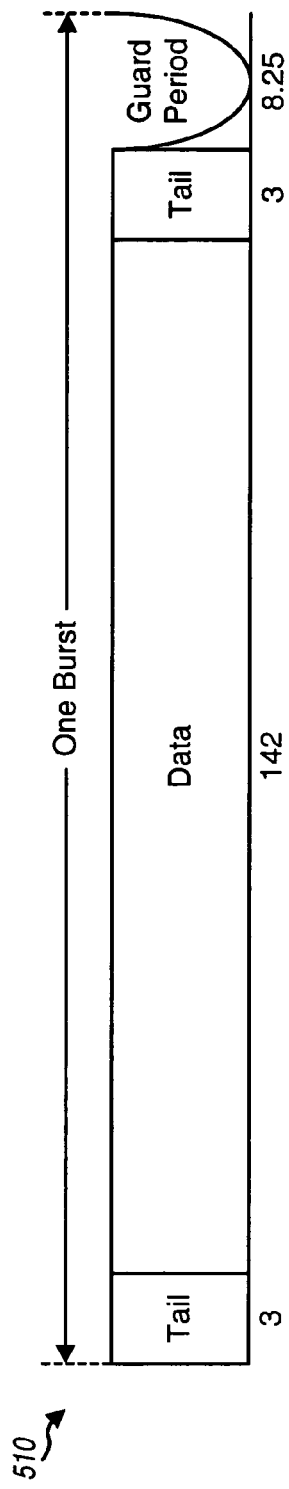
FIG. 5A shows a burst with no training sequence.

FIG. 5A shows an exemplary embodiment of a TS-free burst 510 with no training sequence. TS-free burst 510 includes two tail bit fields and a data field. Each field may have the duration given below the field. In this exemplary embodiment, the training sequence field and the two stealing flag fields are omitted. TS-free burst 510 has an efficiency of approximately 91% (or $142/156.25$) for data, which is an improvement of approximately 24% over normal burst 410 in FIG. 4.

Various other bursts without training sequence may also be defined. In another exemplary embodiment, a TS-free burst includes two tail bit fields, a data field, and a stealing flag field. The stealing flag field may be located next to the left tail bit field, the right tail bit field, or some other location within the burst. In yet another exemplary embodiment, a TS-free burst includes multiple (e.g., two) stealing flag fields that may be located in the symbol positions shown in FIG. 4 or some other positions. In yet another exemplary embodiment, a stealing flag field is combined with the tail bit fields. For example, all zeros for the tail bits may correspond to a stealing flag of '0', and all ones for the tail bits may correspond to a stealing flag of '1'.

In yet another exemplary embodiment, a TS-free burst includes only a data field. The receiver may utilize an equalizer that does not require tail bits at the start and end of a burst. In yet another exemplary embodiment, a TS-free burst includes a cyclic prefix field followed by a data field. The cyclic prefix field carries a copy of the rightmost portion of the data field. The cyclic prefix converts a linear convolution into a circular convolution and allows the receiver to take a fast Fourier transform (FFT1) of a burst and perform equalization in the frequency domain.

A TS-free burst, such as burst 510 in FIG. 5A, may be used for transmission whenever acceptable performance can be achieved without a training sequence. In one exemplary embodiment, a TS-free burst is used for a multi-slot allocation. For example, if N time slots are allocated, where N>1, then the first burst may carry the training sequence, and the second through N-th bursts may omit the training sequence. The receiver may derive a channel estimate based on the training sequence in the first burst and may use this channel estimate for equalization of each subsequent burst. In another exemplary embodiment, a TS-free burst is used for a static or slowly varying channel. For example, if the user is stationary, then the wireless channel may not vary much over time, and good performance may be achieved by sending the training sequence periodically (e.g., every some number of time slots or TDMA frames) instead of every burst. It may also be possible to achieve good performance without sending any training sequence.

In another exemplary embodiment, which may be used for single-slot and multi-slot allocations, normal bursts and TS-free bursts are sent based on a predetermined pattern. This pattern may indicate which time slots to send normal bursts and which time slots to send TS-free bursts. For example, in a multi-slot allocation, the pattern may indicate transmission of normal bursts in the first, middle, and/or other time slots and TS-free bursts in remaining time slots. As another example, in a single-slot allocation, the pattern may indicate transmission of a normal burst in every L-th TDMA frame and TS-free bursts in remaining TDMA frames. The pattern may be defined based on channel conditions and/or other factors and may be updated as needed. In general, if multiple bursts are sent within a sufficiently short period of time (e.g., in consecutive time slots) to the same user, then one or more bursts may be sent with training sequence, and remaining bursts may be sent without training sequence.

In some exemplary embodiments described above, such as the exemplary embodiment shown in FIG. 5A, a TS-free burst does not include any stealing flag field. Signaling may be sent in various manners. In one exemplary embodiment, the first burst in a multi-slot transmission may include stealing flags that may apply to all subsequent bursts in this multi-slot transmission. In another exemplary embodiment, normal burst 410 may be used whenever a stealing flag is needed to indicate transmission of signaling. The receiver may detect the format of a given received burst, e.g., by correlating the received data in the training sequence field against the known training sequence.

Figure 5B:
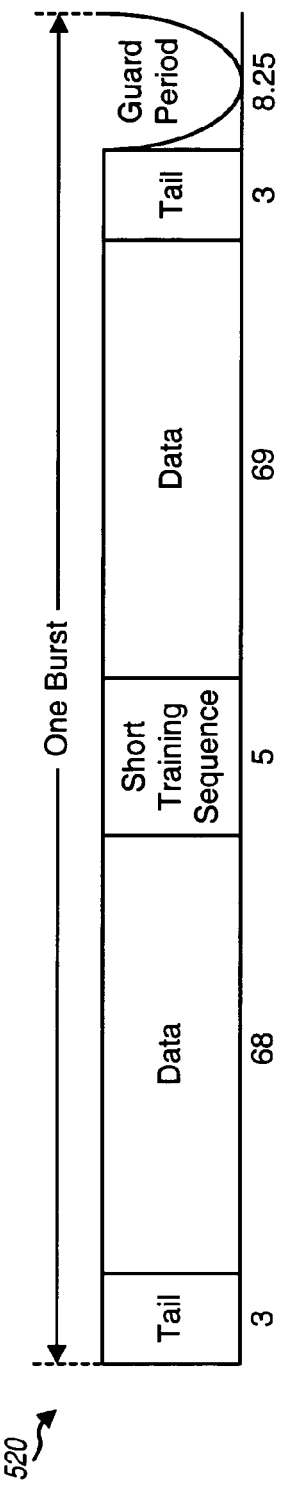
FIG. 5B shows a burst with a short training sequence.

FIG. 5B shows an exemplary embodiment of a short TS burst 520 with a short training sequence. Short TS burst 520 includes two tail bit fields, two data fields, and a short training sequence field. Each field may have the duration given below the field. The short training sequence is shorter than the (normal/full) training sequence in FIG. 4 and may have a duration of five symbol periods, as shown in FIG. 5B, or some other duration. Various other bursts with short training sequence may also be defined.

In general, any combination of normal bursts, TS-free bursts, and short TS bursts may be used for single-slot and multi-slot transmissions. For example, a multi-slot transmission may comprise a normal burst followed by short TS bursts. As another example, a multi-slot transmission may comprise a normal burst followed by a combination of short TS bursts and TS-free bursts. Short TS bursts may be sent periodically (e.g., every other time slot) to assist the receiver with channel tracking and equalization processes. The receiver may be classified as belonging to one of multiple possible classes. One class of receivers may be able to operate well without any training sequence in time slots 2 through N. Another class of receivers may benefit from a short training sequence sent in each of time slots 2 through N. Yet another class of receivers may perform well with a short training sequence sent in only some of time slots 2 through N. A combination of normal bursts, TS-free bursts, and/or short TS bursts may also be used for single-slot transmissions.

Figure 6A:
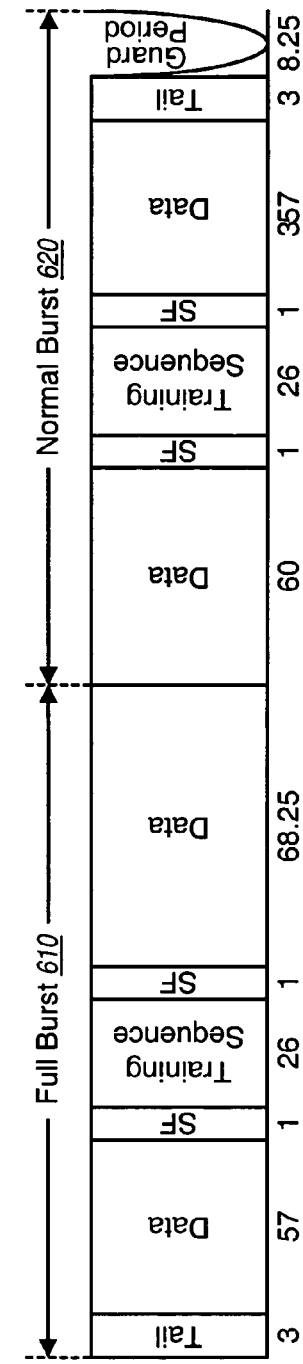
FIG. 6A shows a 2-slot format with no guard period between two bursts.

FIG. 6A shows an exemplary embodiment of a 2-slot format 600 with no guard period between bursts. Slot format 600 includes a full burst 610 having no guard period followed by a normal burst 620 with a guard period. Full burst 610 includes a single tail bit field, two data fields, two stealing flag fields, and a training sequence field. The single tail bit field is located at the start of burst 610, and no tail bit field is included at the end of the burst. The second data field is extended to include the omitted tail bit field and the omitted guard period. Normal burst 620 includes all of the fields of normal burst 410 in FIG. 4 except for the first tail bit field at the start of the burst. The first data field is extended to include the omitted tail bit field. Each field of each burst may have the duration given below the field.

Various other full bursts without guard period may also be defined. For example, a full burst may include (1) only one data field, (2) one or more data fields and a training sequence field, (3) one or more data fields and a short training sequence field, (4) one or more data fields, a training sequence field, and one or more stealing flag fields, (5) one or more data fields and one or more tail bit fields, or (6) some other combination of fields.

A full burst may be used in a multi-slot allocation to improve efficiency by sending data in the guard period between two time slots allocated to the same user. If the user is allocated multiple consecutive time slots, then the transmitter may ramp up before the first time slot and ramp down after the last time slot. Other ramps may be omitted, and data may be sent in all of the guard periods between the first and last bursts.

The tail bit fields may be removed whenever ramp ups and ramp downs are omitted, as shown in FIG. 6A. Other fields in bursts 610 and 620 may also be removed. For example, one of the two training sequence fields may be removed, one of the two sets of stealing flag fields may be removed, and so on.

Figure 6B:
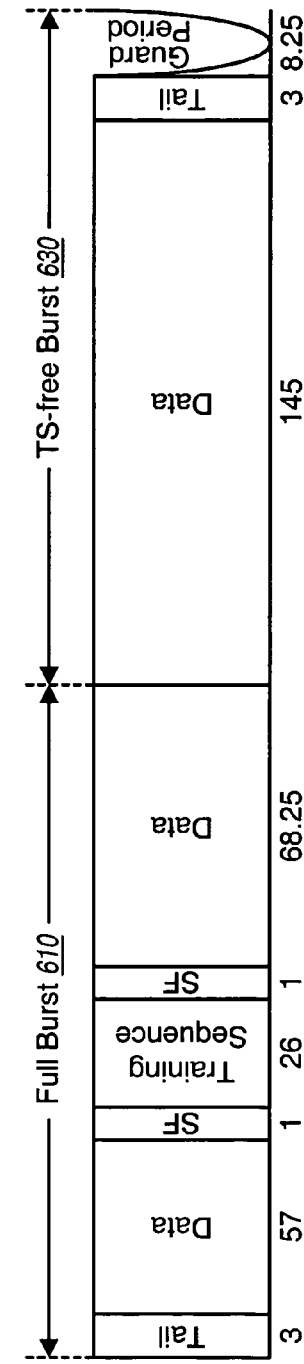
FIGS. 6B and 6C show 2-slot formats with a training sequence shared by two bursts and no guard period between the bursts.

FIG. 6B shows an exemplary embodiment of a 2-slot format 602 with a training sequence shared by two bursts and no guard period between bursts. Slot format 602 includes full burst 610 followed by a TS-free burst 630. TS-free burst 630 includes a single data field, a single tail bit field, and a guard period. The single tail bit field is located at the end of burst 630, and no tail bit field is included at the start of the burst. The data field is extended to include the omitted tail bit field, training sequence field, and stealing flag fields. Each field of each burst may have the duration given below the field.

In slot format 602, the training sequence is sent in the first burst 610 and is located in the same position as the training sequence in normal burst 410 in FIG. 4. This placement of the training sequence in slot format 602 may simplify receiver processing. However, performance may be improved by moving the training sequence to another location.

Figure 6C:
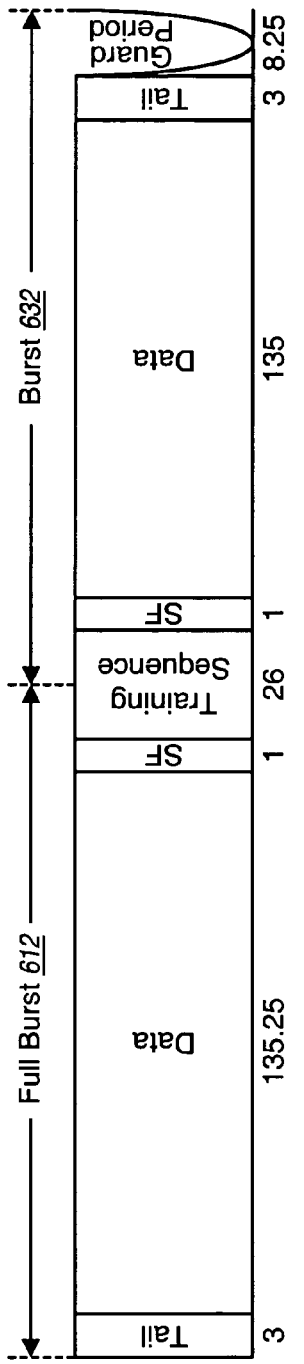

FIG. 6C shows another exemplary embodiment of a 2-slot format 604 with a training sequence shared by two bursts and no guard period between bursts. Slot format 604 includes a full burst 612 followed by a burst 632. The combination of bursts 612 and 632 includes all of the fields of bursts 610 and 630 in FIG. 6B. However, in this exemplary embodiment, the training sequence field and the two stealing flag fields are moved near the center of the two aggregated bursts 612 and 632. Slot format 604 results in the data at the left and right edges of the concatenated bursts having shorter distances to the training sequence than in slot format 602. This centering of the training sequence may improve performance in a time-variant channel.

FIGS. 6A through 6C show exemplary slot formats for two bursts. Other slot formats for two bursts may also be defined with fewer, different, or additional fields and possibly with the fields placed in other locations.

Figure 7A:
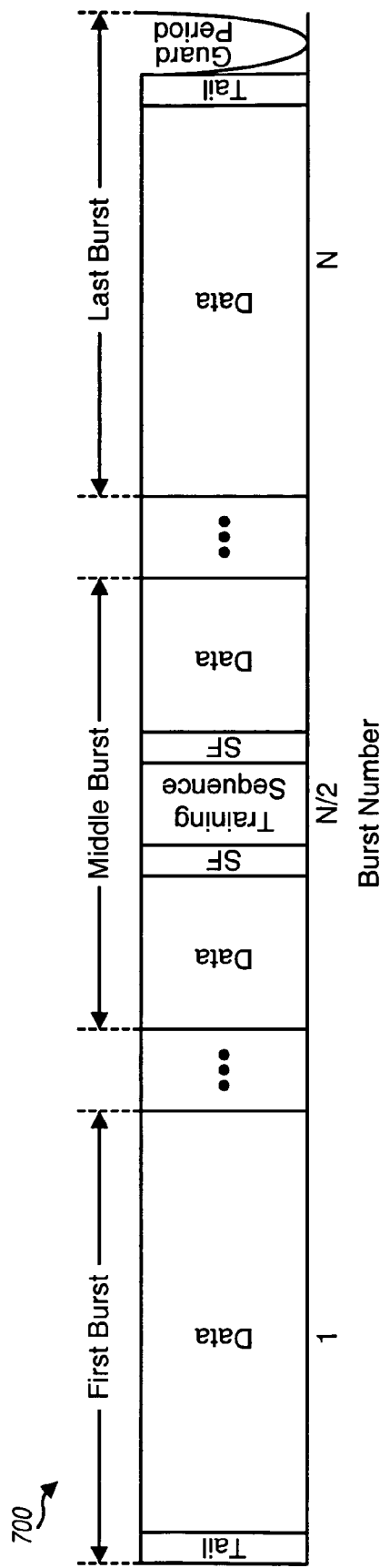
FIG. 7A shows a multi-slot format with a training sequence and no guard period between bursts.

FIG. 7A shows an exemplary embodiment of an N-slot format 700 with a training sequence shared by N bursts and no guard periods between bursts, where N>2. Slot format 700 may be used for a multi-slot allocation of more than two time slots. In this exemplary embodiment, a training sequence field and two stealing flag fields are placed near the center of the N bursts. The training sequence field and stealing flag fields may be located within a single burst, e.g., the middle or N/2-th burst as shown in FIG. 7A (e.g., if N is an odd value) or may span across two bursts, e.g., the N/2-th and (N/2+1)-th bursts as shown in FIG. 6C (e.g., if N is an even value). The first N−1 bursts may be full bursts having no guard periods, and the last burst has a guard period. The first burst may include a tail bit field located at the start of the burst, and the last burst may include a tail bit field located at the end of the burst. In general, an N-slot format may include any combination of fields that may be located anywhere within the N bursts.

Figure 7B:
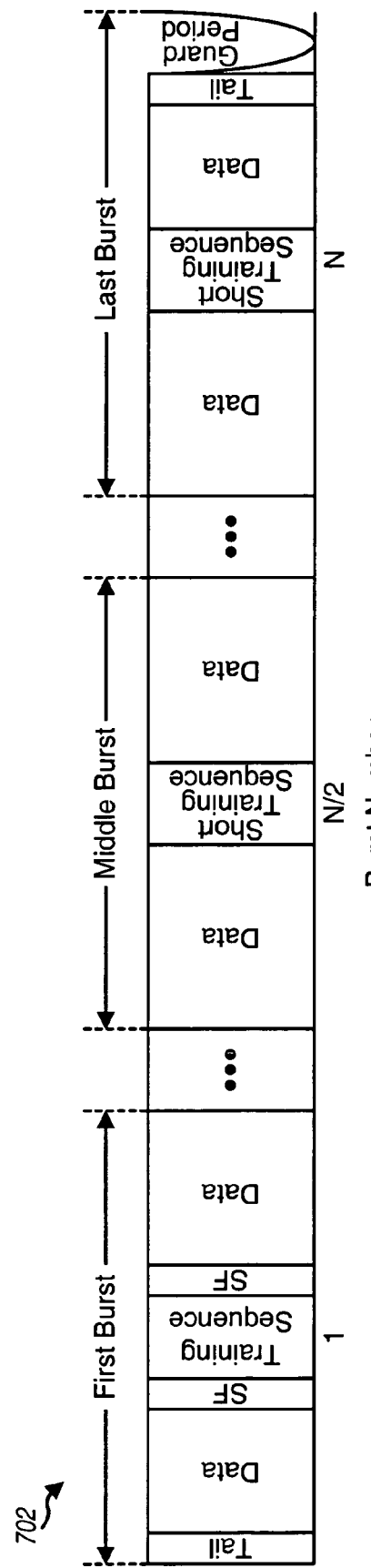
FIG. 7B shows a multi-slot format with full and short training sequences and no guard period between bursts.

FIG. 7B shows an exemplary embodiment of an N-slot format 702 with full and short training sequences and no guard periods between bursts. In this exemplary embodiment, a training sequence field and two stealing flag fields are included in the first burst. A short training sequence may be included in each subsequent burst or only some of the subsequent bursts.

In an exemplary embodiment, a 2-slot format is defined for two time slots, a 3-slot format is defined for three time slots, a 4-slot format is defined for four time slots, and so on. A specific slot format may thus be defined and used for each possible multi-slot allocation. The receiver would then have knowledge of the slot format used for a given multi-slot transmission based on the number of allocated time slots.

In general, various multi-slot formats may be defined for aggregation of time slots in multi-slot allocations. Intermediate ramp ups and ramp downs, and hence the guard periods, between allocated time slots may be removed. In an exemplary embodiment, a single training sequence is sent in a multi-slot transmission, while the rest of the transmission is mostly data, as shown in FIGS. 6B through 7B. In other exemplary embodiments, a multi-slot transmission may include (1) a full training sequence and one or more short training sequences, (2) multiple full training sequences, (3) multiple short training sequences, (4) some other combination of full and short training sequences, or (5) no training sequence. In one exemplary embodiment, tail bit fields are included at the start and end of a multi-slot transmission, as shown in FIGS. 6A through 7B. In other exemplary embodiments, one or more additional tail bit fields may be included during (e.g., in the middle of) a multi-slot transmission.

The removal of overhead fields, such as the training sequence fields, guard periods, stealing flag fields, and tail bit fields, allows more data symbols to be sent in the removed overhead fields. The additional data capacity may be viewed as an increase in bandwidth at the physical layer, which may be used to send more data symbols. The additional data capacity may also be exploited to improve performance or increase protection, as described below.

Slot aggregation refers to combining or aggregation of multiple time slots such that the bursts sent in these time slots can share training sequence and achieve higher data efficiency through removal of some overhead fields. As shown in FIGS. 6B through 7B, any number of time slots may be combined to form an aggregated slot. In one exemplary embodiment, each time slot has a duration of 156.25 symbol periods. Multiple time slots may be aggregated such that the guard period at the end of the last burst is at least 8 symbol periods long. In another exemplary embodiment, a TDMA frame is defined having 8 time slots of 157, 156, 156, 156, 157, 156, 156 and 156 symbol periods. For both exemplary embodiments, continuous symbol timing may be maintained across an entire aggregated slot so that complication introduced by the 0.25 symbol between consecutive time slots can be avoided.

The removal of the training sequence may not degrade performance. For small aggregations (e.g., aggregation of two time slots), the duration of a new slot format may still be within the coherence time of interest. The coherence time is the time span in which a wireless channel is deemed to be relatively static. For example, even at 200 Km/h in GSM900 frequency band, the coherence time is approximately 3 ms, which is longer than five time slots. The coherence time is even longer for lower velocities. Hence, a single training sequence may be able to provide good performance when placed near the middle of an aggregated slot covering four or possibly more time slots. Additional full or short training sequence(s) may be sent, if needed, to achieve the desired performance.

The receiver may also implement a channel tracking equalizer to improve performance for larger aggregations (e.g., aggregation of four or more time slots). The channel tracking equalizer may be based on an adaptive maximum likelihood sequence estimator (MLSE), least mean square (LMS) and/or Kalman filtering, and so on.

2. Block Formats for RLC/MAC

Referring back to FIG. 3, a packet data block includes a L2 header and an L2 payload. The L2 header indicates the intended recipient of the packet data block among all users assigned with the time slots used to send the packet data block. EDGE supports coding schemes CS1 through CS4 and MC1 through MC9. The L2 payload carries one block of data for coding schemes CS1 through CS4 and MCS1 through MCS6 and two blocks of data for MCS7 through MCS9. Each block is appended with 12 parity bits (BCS) followed by six '0' tail bits to form a formatted block. These parity bits are referred to as a block code sequence (BCS) and are used for error detection. Each formatted block is encoded with a convolutional code and punctured to obtain a code block having the desired number of code bits. Similarly, the L2 header is appended with eight parity bits followed by six tail bits, encoded with another convolutional code, and punctured to generate a coded header. The parity bits for the L2 header are referred to as a header code sequence (HCS) and are used for error detection. The coded header and coded block(s) are multiplexed, interleaved, and partitioned into four output blocks. Four bursts are generated for the four output blocks and sent in four time slots with the same index in four consecutive TDMA frames, as shown in FIG. 3.

Figure 8:
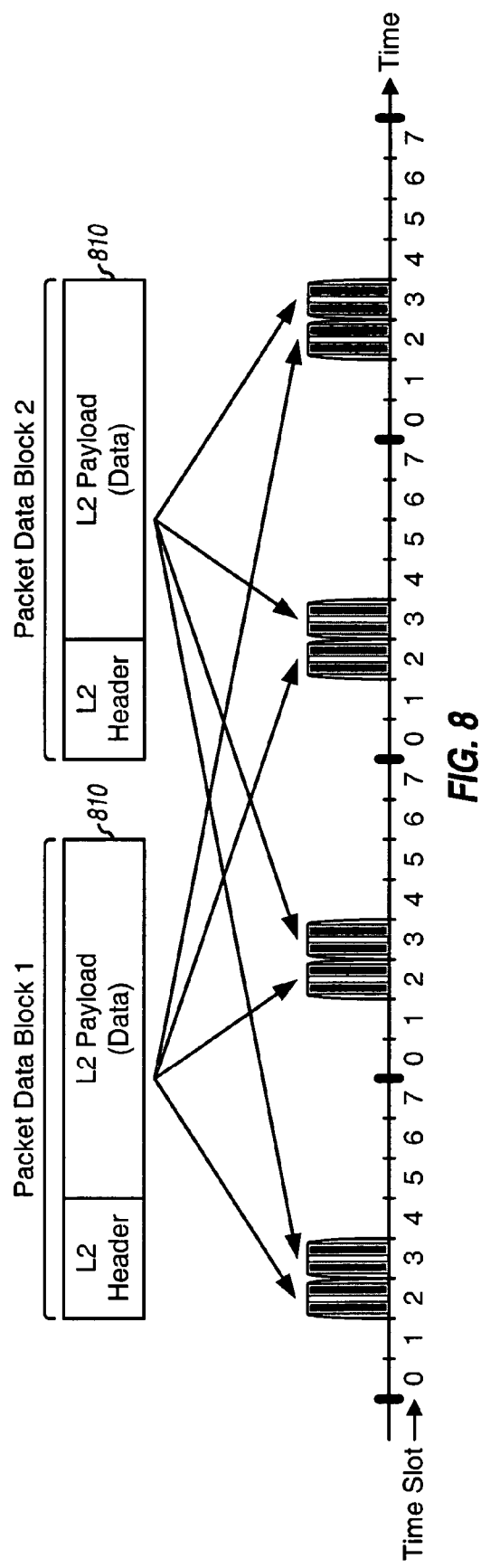
FIG. 8 shows transmission of two packet data blocks in a 2-slot allocation.

FIG. 8 shows transmission of two packet data blocks 810 in a 2-slot allocation. Each packet data block 810 is processed to generate four bursts, which are sent in four time slots. In general, with the conventional block format shown in FIG. 8, L packet data blocks are sent in an allocation of L time slots, where L≧1. One packet data block is sent in each allocated time slot. Each packet data block is processed and transmitted in the same manner regardless of whether any other packet data blocks are also being sent. Each packet data block includes an L2 header, which is overhead that reduces data efficiency. The coded header represents a large percentage (approximately 17%) of the coded packet data block for lower data rates of MCS1 through MCS4 in GSM.

In another exemplary embodiment, new block formats having higher data efficiency are described. These new block formats support aggregation of data to be sent in a multi-slot allocation (or data block aggregation) and may be used for allocations of two or more time slots. These new block formats may be used with conventional slot formats (e.g., normal burst 410 shown in FIG. 4) as well as with the new slot formats described above.

Figure 9A:
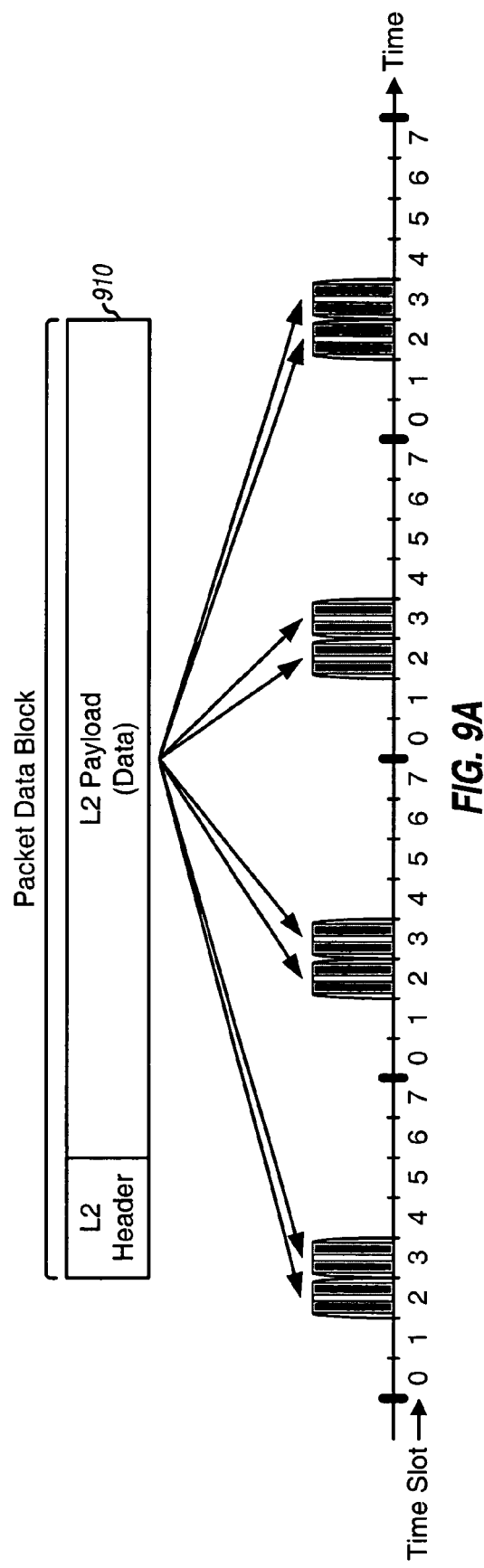

FIG. 9A shows a format of a packet data block 910 sent in a 2-slot allocation using normal bursts 410 in FIG. 4. Packet data block 910 includes an L2 header that may have the same size and format as the L2 header of packet data block 810 in FIG. 8. However, the L2 payload of packet data block 910 is more than twice the L2 payload of packet data block 810 due to the use only one L2 header for the 2-slot allocation. Packet data block 910 is processed to generate four output blocks that are sent in four TDMA frames. Each output block is sent as two bursts in two time slots of one TDMA frame.

FIG. 9B shows a format of a packet data block 920 sent in a 2-slot allocation using 2-slot format 602 in FIG. 6B. Packet data block 920 includes an L2 header that may have the same size and format as the L2 header of packet data block 810 in FIG. 8. However, the L2 payload of packet data block 920 is larger than the L2 payload of packet data block 910 due to the higher capacity of the two bursts in 2-slot format 602. For example, packet data block 920 may include two blocks of data for coding schemes MCS1 through MCS6 and four blocks of data for MCS7 through MCS9

FIG. 9C shows a format of a packet data block 930 sent in an N-slot allocation using N-slot format 700 in FIG. 7A. Packet data block 930 may be processed to generate four output blocks, which may be sent in four TDMA frames. Each output block is sent in an aggregated slot composed of N time slots. Packet data block 930 includes a single L2 header and has an L2 payload that is more than N times the L2 payload of packet data block 810. The additional data capacity results from not having to include L2 headers for time slots 2 through N as well as higher capacity of the N bursts in N-slot format 700.

FIGS. 9A through 9C show exemplary new block formats for 2-slot and N-slot allocations. Other new block formats may also be defined. In an exemplary embodiment, a 2-slot block format is defined for an allocation of two time slots, a 3-slot block format is defined for an allocation of three time slots, a 4-slot block format is defined for an allocation of four time slots, and so on. In this exemplary embodiment, a specific block format may be used for each possible multi-slot allocation. The receiver would then have knowledge of the packet data block being sent in a given multi-slot transmission based on the number of allocated time slots.

In the exemplary embodiments described above, a packet data block is sent over four TDMA frames to achieve time diversity. In other exemplary embodiments, a packet data block may be sent in fewer or more than four TDMA frames. For example, to achieve a shorter transmission time interval (TTI), a packet data block may be (1) partitioned into two output blocks and sent in two TDMA frames or (2) sent as one output block in one TDMA frame. Each output block may be sent in multiple time slots with a multi-slot allocation.

3. Aggregation at Physical and RLC/MAC Layers

As shown in FIGS. 6A through 9C, aggregation of data blocks at RLC/MAC may be performed independently of aggregation of time slots/bursts at the physical layer. For aggregation at only the physical layer, multiple (K) packet data blocks may be processed to generate K sets of output blocks. Each aggregated slot may then carry K output blocks for the K packet data blocks. For aggregation at only RLC/MAC, a single packet data block may be processed to generate multiple sets of four output blocks. Each set of output blocks may then be sent in four time slots of the same index, as shown in FIGS. 9A and 9B. For aggregation at both the physical layer and RLC/MAC, a single packet data block may be processed to generate one set of output blocks, and each output block may be sent in an aggregated slot composed of multiple time slots.

The new slot and block formats described herein improve data capacity by reducing overhead. More data may be sent with the higher data capacity. Hence, higher data rates and throughput may be achieved with the new slot and block formats.

The new slot and block formats also support more efficient coding schemes, which may provide additional gains. Tail-biting convolutional coding in GSM with Viterbi decoding may provide good performance for small block sizes (e.g., up to 150 bits). Larger blocks may be sent using the multi-slot formats and/or multi-slot block formats described above. The larger blocks may be encoded with more efficient codes such as Turbo codes, hyper-codes, low density parity check (LDPC) codes, and/or some other codes that can outperform tail-biting convolutional code for larger blocks (e.g., more than 150 bits). For example, a Turbo code with four iterations may yield gains of approximately 1.5, 1.8 and 2.0 decibels (dB) in terms of energy-per-bit-to-total-noise ratio (Eb/No) for larger packet data blocks sent in 2, 3 and 4 aggregated time slots, respectively, over a convolutional code with constraint length of K=7.

The new slot and block formats may also be used with a larger BCS (e.g., 16 bits instead of 12 bits) for improve error detection performance, new puncturing and/or coding schemes for improved error correction performance, or a combination thereof.

A wireless network may support conventional and new slot formats. Alternatively or additionally, the wireless network may support conventional and new block formats. Signaling may be used to indicate the capability of the wireless network and the mobile stations in terms of support for the new slot and block formats. Signaling may also be used to indicate whether conventional or new slot formats and whether conventional or new block formats are being used. In an exemplary embodiment, signaling may be performed as follows:

A mobile station signals support for new slot and/or block formats in a Classmark information element and/or an MS Radio Access Capabilities message, which are described in 3GPP TS 04.18, entitled "Technical Specification Group GSM EDGE Radio Access Network; Mobile radio interface layer 3 specification, Radio Resource Control Protocol," Release 1999, June 2001.

The wireless network assigns the mobile station to a packet data channel (PDCH) and determines whether the PDCH employs new slot and/or block formats for the mobile station, if the mobile station supports them. This allows the wireless network to operate in a "legacy" mode and use conventional slot and block formats for "new" mobile stations that can support the new slot and block formats.

The new slot and block formats may be used for downlink transmission from a base station to a mobile station as well as for uplink transmission from a mobile station to a base station. The same or different new slot formats may be used for the downlink and uplink. Similarly, the same or different new block formats may be used for the downlink and uplink. The specific slot and block formats to use for each link may be selected separately, e.g., based on capabilities of the wireless network and the mobile station, channel conditions, and/or other factors.

Figure 10:
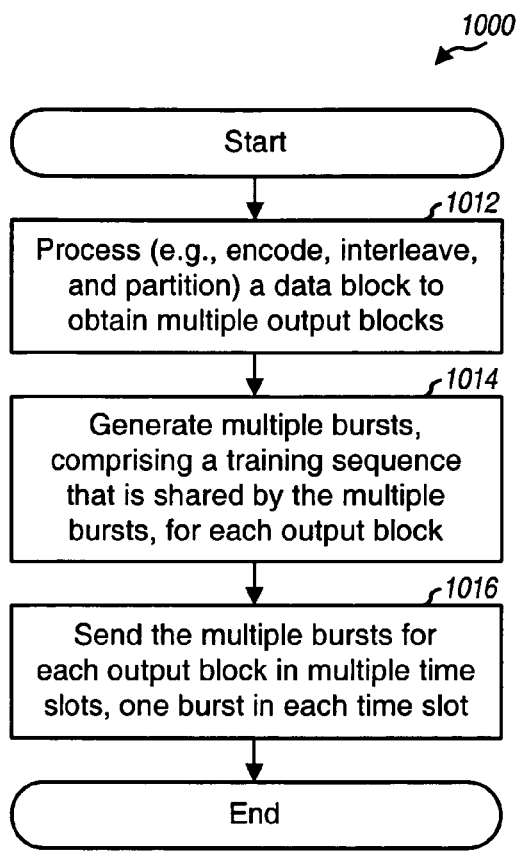
FIG. 10 shows a process for transmitting data with slot aggregation.

FIG. 10 shows an exemplary embodiment of a process 1000 for transmitting data with slot aggregation. Process 1000 may be performed by a transmitter, which may be a base station for downlink transmission or a mobile station for uplink transmission. A data block is processed (e.g., encoded, interleaved, and partitioned) to obtain multiple output blocks (block 1012). Multiple bursts comprising a training sequence that is shared by the multiple bursts are generated for each output block (block 1014). The multiple bursts for each output block are sent in multiple time slots (e.g., consecutive time slots in one TDMA frame), one burst in each time slot (block 1016).

The multiple bursts for each output block may be generated in accordance with GSM/EDGE. The multiple bursts may also be generated in various manners. The multiple bursts may comprise a first burst with the training sequence and a second burst without a training sequence, e.g., as shown in FIG. 6B. The training sequence may also be located near the middle of the multiple bursts, e.g., as shown in FIGS. 6C and 7A. The multiple bursts may further comprise at least one short training sequence, with each short training sequence being shorter than the training sequence, e.g., as shown in FIG. 7B. For example, the training sequence may be sent in the first burst, and each remaining burst may comprise a short training sequence.

The multiple bursts may have no guard period between adjacent bursts. A guard period may follow the last burst. The multiple bursts may include at least one burst having only data and tail bits, e.g., as shown in FIGS. 5A, 6B and 7A. The multiple bursts may comprise a first tail bit field located at the start of the first burst and a second tail bit field located at the end of the last burst, e.g., as shown in FIGS. 6B through 7B. The multiple bursts may comprise at least one stealing flag field.

Figure 11:
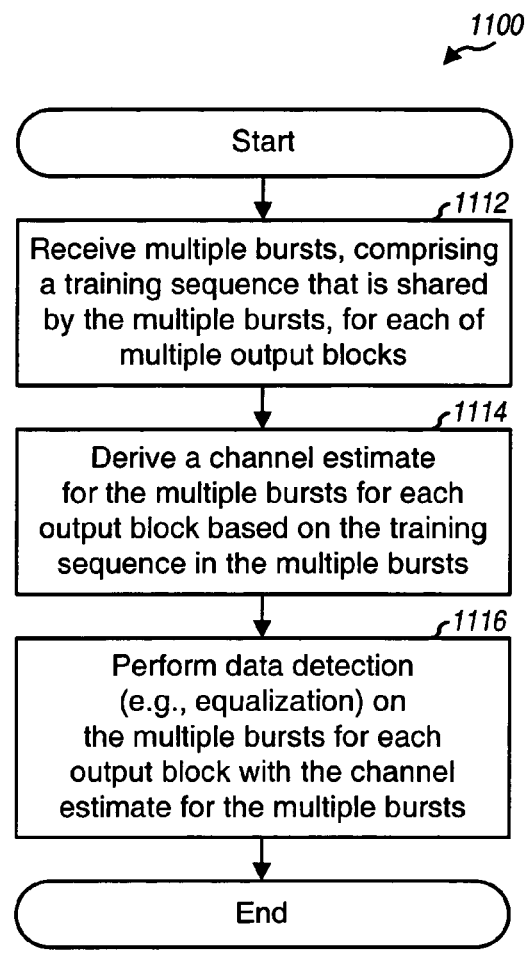
FIG. 11 shows a process for receiving data with slot aggregation.

FIG. 11 shows an exemplary embodiment of a process 1100 for receiving data with slot aggregation. Process 1100 may be performed by a receiver, which may be a base station for uplink transmission or a mobile station for downlink transmission. Multiple bursts comprising a training sequence that is shared by the multiple bursts are received for each of multiple output blocks (block 1112). The multiple bursts for each output block are received in multiple time slots, one burst in each time slot. A channel estimate is derived for the multiple bursts for each output block based on the training sequence in the multiple bursts (block 1114). Data detection (e.g., equalization) is performed on the multiple bursts for each output block with the channel estimate for the multiple bursts (block 1116). The multiple bursts may further comprise at least one short training sequence. The channel estimate for the multiple bursts for each output block may then be updated with the at least one short training sequence in the multiple bursts for that output block.

FIG. 12 shows an exemplary embodiment of a process 1200 for transmitting data with data block aggregation. A data block is processed (e.g., encoded, interleaved, and partitioned) to obtain multiple output blocks (block 1212). The data block may comprise a header indicating the intended recipient of the data block and a payload carrying data. The data block may have a size determined by the number of time slots allocated for the data block. The data block may be encoded with a Turbo code, a convolutional code, and/or some other code to generate coded data, and the coded data may be partitioned into the multiple output blocks. At least two bursts are generated for each output block (block 1214). The at least two bursts for each output block are sent in at least two time slots (e.g., consecutive time slots) of a respective frame, one burst in each time slot (block 1216). The bursts for different output blocks are sent in different frames. For example, four output blocks may be obtained for the data block, and the bursts for the four output blocks may be sent in four consecutive frames.

The bursts for each output block may (1) comprise a training sequence that is shared by these bursts, (2) have no guard period between adjacent bursts, and/or (3) comprise a first tail bit field located at the start of the first burst and a second tail bit field located at the end of the last burst. The bursts for each output block may also have different and/or additional fields.

FIG. 13 shows an exemplary embodiment of a process 1300 for receiving data with data block aggregation. At least two bursts are received for each of multiple output blocks (block 1312). The bursts for different output blocks are received in different frames, and each burst for each output block is received in one time slot of a respective frame. The bursts received for the multiple output blocks are processed (e.g., equalized) to obtain symbol estimates (block 1314). For block 1314, a channel estimate may be derived for the bursts for each output block based on the training sequence in these bursts. The bursts for each output block may then be equalized with the channel estimate to obtain the symbol estimates for the output block. The symbol estimates are decoded (e.g., with a Turbo decoder, a Viterbi decoder, or some other decoder) to obtain a decoded data block (block 1316).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the exemplary embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating certain sections. These headings are not intended to limit the scope of the concepts described therein under, and these concepts may have applicability in other sections throughout the entire specification.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. An apparatus comprising:
   at least one processor to generate multiple bursts comprising a training sequence that is shared by the multiple bursts and to send the multiple bursts in multiple time slots, one burst in each time slot, the training sequence being selected from a predetermined set of training sequences, wherein the multiple bursts comprise a first burst with the training sequence and a second burst without a training sequence; and
   a memory coupled to the at least one processor.

2. An apparatus comprising:
   at least one processor to generate multiple bursts comprising a training sequence that is shared by the multiple bursts and to send the multiple bursts in multiple time slots, one burst in each time slot, the training sequence being selected from a predetermined set of training sequences, wherein the multiple bursts further comprise at least one short training sequence, each short training sequence being shorter than the training sequence; and
   a memory coupled to the at least one processor.

3. An apparatus comprising:
   at least one processor to generate multiple bursts comprising a training sequence that is shared by the multiple bursts and to send the multiple bursts in multiple time slots, one burst in each time slot, the training sequence being selected from a predetermined set of training sequences, wherein the training sequence is sent in a first burst of the multiple bursts, and wherein each remaining burst comprises a short training sequence that is shorter than the training sequence; and
   a memory coupled to the at least one processor.

4. An apparatus comprising:
   at least one processor to generate multiple bursts comprising a training sequence that is shared by the multiple bursts and to send the multiple bursts in multiple time slots, one burst in each time slot, the training sequence being selected from a predetermined set of training sequences, wherein the multiple bursts comprise at least one burst having only data and tail bits; and a memory coupled to the at least one processor.

5. An apparatus comprising:

at least one processor to generate multiple bursts comprising a training sequence that is shared by the multiple bursts and to send the multiple bursts in multiple time slots, one burst in each time slot, the training sequence being selected from a predetermined set of training sequences, wherein the multiple bursts further comprise a first tail bit field located at the start of a first burst and a second tail bit field located at the end of a last burst among the multiple bursts; and a memory coupled to the at least one processor.

6. An apparatus comprising:

at least one processor to generate multiple bursts comprising a training sequence that is shared by the multiple bursts and to send the multiple bursts in multiple time slots, one burst in each time slot, the training sequence being selected from a predetermined set of training sequences, wherein the multiple bursts further comprise at least one stealing flag field; and a memory coupled to the at least one processor.

7. A method comprising:

generating multiple bursts comprising a training sequence that is shared by the multiple bursts, the training sequence being selected from a predetermined set of training sequences, wherein the generating the multiple bursts comprises generating at least one burst to have only data and tail bits; and sending the multiple bursts in multiple time slots, one burst in each time slot.

8. An apparatus comprising:

means for generating multiple bursts comprising a training sequence that is shared by the multiple bursts, the training sequence being selected from a predetermined set of training sequences, wherein the means for generating the multiple bursts comprises generating at least one burst to have only data and tail bits; and means for sending the multiple bursts in multiple time slots, one burst in each time slot.

9. An apparatus comprising:

at least one processor to receive multiple bursts comprising a training sequence that is shared by the multiple bursts, to derive a channel estimate based on the training sequence, and to perform data detection on the multiple bursts with the channel estimate, the multiple bursts received in multiple time slots, one burst in each time slot, the training sequence being selected from a predetermined set of training sequences, wherein the multiple bursts further comprise at least one short training sequence, each short training sequence being shorter than the training sequence, and wherein the at least one processor updates the channel estimate with the at least one short training sequence; and a memory coupled to the at least one processor.

10. An apparatus comprising:

at least one processor to process a data block to obtain multiple output blocks, to generate at least two bursts for each output block, and to send the at least two bursts for each output block in at least two time slots of a respective frame, one burst in each time slot, the bursts for different output blocks sent in different frames, the training sequence being selected from a predetermined set of training sequences; and a memory coupled to the at least one processor.

11. The apparatus of claim 10, wherein the at least two bursts for each output block are sent in consecutive time slots.

12. The apparatus of claim 10, wherein four output blocks are obtained for the data block, and wherein the bursts for the four output blocks are sent in four consecutive frames.

13. The apparatus of claim 10, wherein the data block comprises a header indicating an intended recipient of the data block and a payload carrying data.

14. The apparatus of claim 10, wherein the data block has a size determined based on the number of time slots allocated for the data block.

15. The apparatus of claim 10, wherein the at least one processor encodes the data block with a Turbo code to generate coded data and partitions the coded data into the multiple output blocks.

16. The apparatus of claim 10, wherein the at least two bursts for each output block comprise a training sequence that is shared by the at least two bursts.

17. The apparatus of claim 10, wherein the at least two bursts for each output block have no guard periods between adjacent bursts.

18. The apparatus of claim 10, wherein the at least two bursts for each output block comprise a first tail bit field located at the start of a first burst and a second tail bit field located at the end of a last burst among the at least two bursts.

19. A method comprising:

processing a data block to obtain multiple output blocks;

generating at least two bursts for each output block, the at least two bursts for each output block comprising a shared training sequence; and sending the at least two bursts for each output block in at least two time slots of a respective frame, one burst in each time slot, and the bursts for different output blocks sent in different frames.

20. The method of claim 19, further comprising:

determining a size of the data block based on the number of time slots allocated for the data block.

21. An apparatus comprising:

means for processing a data block to obtain multiple output blocks;

means for generating at least two bursts for each output block, the at least two bursts for each output block comprising a shared training sequence; and means for sending the at least two bursts for each output block in at least two time slots of a respective frame, one burst in each time slot, and the bursts for different output blocks sent in different frames.

22. The apparatus of claim 21, further comprising:

means for determining size of the data block based on the number of time slots allocated for the data block.

23. An apparatus comprising:

at least one processor configured to receive at least two bursts for each of multiple output blocks, to process the bursts received for the multiple output blocks to obtain symbol estimates, and to decode the symbol estimates to obtain a decoded data block, wherein bursts for different output blocks are received in different frames, each burst for each output block is received in one time slot of a respective frame, and the at least two bursts comprise a shared training sequence; and a memory coupled to the at least one processor.

24. The apparatus of claim 23, wherein the at least one processor derives a channel estimate for the at least two bursts for each output block based on the shared training sequence in the at least two bursts, and processes the at least two bursts for each output block with the channel estimate to obtain symbol estimates for the output block.

25. A computer program product comprising:
a processor-readable medium storing processor-readable instructions configured to cause a processor to:
generate multiple bursts comprising a training sequence that is shared by the multiple bursts, the training sequence being selected from a predetermined set of training sequences, wherein the multiple bursts comprise a first burst with the training sequence and a second burst without a training sequence; and
send the multiple bursts in multiple time slots, one burst in each time slot.

26. A computer program product comprising:
a processor-readable medium storing processor-readable instructions configured to cause a processor to:
generate multiple bursts comprising a training sequence that is shared by the multiple bursts, the training sequence being selected from a predetermined set of training sequences, wherein the training sequence is sent in a first burst of the multiple bursts, and wherein each remaining burst comprises a short training sequence that is shorter than the training sequence; and
send the multiple bursts in multiple time slots, one burst in each time slot.

27. A method comprising:
receiving multiple bursts comprising a training sequence that is shared by the multiple bursts;
deriving a channel estimate based on the training sequence; and
performing data detection on the multiple bursts with the channel estimate,
wherein the multiple bursts are received in multiple time slots, one burst in each time slot, and the training sequence is selected from a predetermined set of training sequences, and
wherein the multiple bursts further comprise at least one short training sequence, each short training sequence being shorter than the training sequence, the method further comprising updating the channel estimate with the at least one short training sequence.

28. An apparatus comprising:
means for receiving multiple bursts comprising a training sequence that is shared by the multiple bursts;
means for deriving a channel estimate based on the training sequence; and
means for performing data detection on the multiple bursts with the channel estimate,
wherein the multiple bursts are received in multiple time slots, one burst in each time slot, and the training sequence is selected from a predetermined set of training sequences, and
wherein the multiple bursts further comprise at least one short training sequence, each short training sequence being shorter than the training sequence, the apparatus further comprising means for updating the channel estimate with the at least one short training sequence.

29. A computer program product comprising:
a processor-readable medium storing processor-readable instructions configured to cause a processor to:
receive multiple bursts comprising a training sequence that is shared by the multiple bursts;
derive a channel estimate based on the training sequence; and
perform data detection on the multi le bursts with the channel estimate
wherein the multiple bursts are received in multiple time slots, one burst in each time slot, and the training sequence is selected from a predetermined set of training sequences, and
wherein the multiple bursts further comprise at least one short training sequence, each short training sequence being shorter than the training sequence, and wherein the instructions are further configured to cause the processor to update the channel estimate with the at least one short training sequence.

30. A computer program product comprising:
a processor-readable medium storing processor-readable instructions configured to cause a processor to:
process a data block to obtain multiple output blocks;
generate at least two bursts for each output block, the at least two bursts for each output block comprising a shared training sequence; and
send the at least two bursts for each output block in at least two time slots of a respective frame, one burst in each time slot, and the bursts for different output blocks sent in different frames.

31. The computer program product of claim 30, wherein the instructions are further configured to cause the processor to determine a size of the data block based on the number of time slots allocated for the data block.

32. A computer program product comprising:
a processor-readable medium storing processor-readable instructions configured to cause a processor to:
receive at least two bursts for each of multiple output blocks;
process the bursts received for the multiple output blocks to obtain symbol estimates; and
decode the symbol estimates to obtain a decoded data block,
wherein bursts for different output blocks are received in different frames, each burst for each output block is received in one time slot of a respective frame, and the at least two bursts comprise a shared training sequence.

33. The computer program product of claim 32, wherein the instructions are configured to cause the processor to derive a channel estimate for the at least two bursts for each output block based on the shared training sequence, and to process the at least two bursts for each output block with the channel estimate to obtain symbol estimates for the output block.

34. An apparatus comprising:
means for receiving at least two bursts for each of multiple output blocks;
means for processing the bursts received for the multiple output blocks to obtain symbol estimates; and
means for decoding the symbol estimates to obtain a decoded data block,
wherein bursts for different output blocks are received in different frames, each burst for each output block is received in one time slot of a respective frame, and the at least two bursts comprise a shared training sequence.

35. The apparatus of claim 34, further comprising:
means for deriving a channel estimate for the at least two bursts for each output block based on the shared training sequence; and
means for processing the at least two bursts for each output block with the channel estimate to obtain symbol estimates for the output block.

36. A method comprising:

receiving at least two bursts for each of multiple output blocks;

processing the bursts received for the multiple output blocks to obtain symbol estimates; and decoding the symbol estimates to obtain a decoded data block, wherein bursts for different output blocks are received in different frames, each burst for each output block is received in one time slot of a respective frame, and the at least two bursts comprise a shared training sequence.

37. The method of claim 36, further comprising:

deriving a channel estimate for the at least two bursts for each output block based on the shared training sequence; and processing the at least two bursts for each output block with the channel estimate to obtain symbol estimates for the output block.

* * * * *